US012137720B2

(12) United States Patent
Dubief et al.

(10) Patent No.: US 12,137,720 B2
(45) Date of Patent: Nov. 12, 2024

(54) METHOD FOR ROASTING COFFEE BEANS

(71) Applicant: SOCIETE DES PRODUITS NESTLE S.A., Vevey (CH)

(72) Inventors: Flavien Dubief, Champagne (CH); Stefano Ceccaroli, Chavornay (CH)

(73) Assignee: Societe des Produits Nestle S.A., Vevey (CH)

( * ) Notice: Subject to any disclaimer, the term of this patent is extended or adjusted under 35 U.S.C. 154(b) by 742 days.

(21) Appl. No.: 17/414,121

(22) PCT Filed: Dec. 17, 2019

(86) PCT No.: PCT/EP2019/085756
§ 371 (c)(1),
(2) Date: Jun. 15, 2021

(87) PCT Pub. No.: WO2020/127350
PCT Pub. Date: Jun. 25, 2020

(65) Prior Publication Data
US 2022/0046974 A1 Feb. 17, 2022

(30) Foreign Application Priority Data

Dec. 17, 2018 (EP) .................................. 18212968

(51) Int. Cl.
*A23N 12/12* (2006.01)
*A23F 5/04* (2006.01)
*A23N 12/08* (2006.01)

(52) U.S. Cl.
CPC ................ *A23N 12/08* (2013.01); *A23F 5/04* (2013.01); *A23N 12/125* (2013.01)

(58) Field of Classification Search
CPC .......... A23N 12/08; A23N 12/125; A23F 5/04
(Continued)

(56) References Cited

U.S. PATENT DOCUMENTS 5,996,480 A * 12/1999 Kelley ................... A23N 12/08
99/286
6,195,912 B1 * 3/2001 Moon .................... A23N 12/08
426/465
(Continued)

FOREIGN PATENT DOCUMENTS

AU          8907001 A      3/2002
CA          2304324 A1     9/2000
(Continued)

OTHER PUBLICATIONS

Brazil Office Action for Appl No. BR112021010175-6 dated Aug. 30, 2023.
(Continued)

*Primary Examiner* — Omar Flores Sanchez
(74) *Attorney, Agent, or Firm* — K&L Gates LLP

(57) ABSTRACT

The invention concerns an apparatus for roasting coffee beans comprising:—a vessel (1) to contain coffee beans,—an electrical heating device (13) to heat coffee beans contained in the vessel,—at least one temperature sensor (23) to measure temperature in the vessel,—a control system (180) operable to control the heating device, wherein the control system is configured to:—apply a roasting recipe dedicated to the roasting of partially pre-roasted beans comprising at least a temperature versus time profile by controlling the electrical heating device based on the measure of the temperature sensor,—detect a decrease of the consumption of electrical power of the heating device in function of time,—stop heating if no decrease of the consumption of electrical
(Continued)

power happens after a set reference time ti.—continue or stop the electrical heating device depending on the type of identified beans.

15 Claims, 2 Drawing Sheets

(58) Field of Classification Search
USPC .................................................. 99/32
See application file for complete search history.

(56) References Cited

U.S. PATENT DOCUMENTS

| 2004/0074400 | A1  | 4/2004  | Song |
| 2004/0142078 | A1  | 7/2004  | Eichner |
| 2016/0120211 | A1* | 5/2016  | Wilson .................. A23N 12/08 99/325 |
| 2017/0251691 | A1* | 9/2017  | Shi ....................... A23N 12/12 |
| 2018/0255802 | A1* | 9/2018  | Yamamoto ............... A23F 5/04 |
| 2018/0295870 | A1  | 10/2018 | Lopez et al. |
| 2022/0079203 | A1* | 3/2022  | Dubief .................. A23N 12/08 |
| 2024/0032559 | A1* | 2/2024  | Morend ................. A23N 12/12 |

FOREIGN PATENT DOCUMENTS

| CN | 102232797 A   | 11/2011 |
| CN | 106604646 A   | 4/2017  |
| CN | 105249505 B   | 6/2017  |
| JP | H06303906 A   | 11/1994 |
| RU | 2203553 C1    | 5/2003  |
| WO | 03049549 A1   | 6/2003  |
| WO | 2013108283    | 7/2013  |
| WO | 2015110337    | 7/2015  |
| WO | 2015162021    | 10/2015 |
| WO | 2016071165 A1 | 5/2016  |
| WO | 2018053436    | 3/2018  |
| WO | 2018135021    | 7/2018  |

OTHER PUBLICATIONS

Russian Office Action for Appl No. 2021119855/10 dated May 17, 2023.

* cited by examiner

METHOD FOR ROASTING COFFEE BEANS

CROSS REFERENCE TO RELATED APPLICATIONS

The present application is a National Stage of International Application No. PCT/EP2019/085756, filed on Dec. 17, 2019, which claims priority to European Patent Application No. 18212968.4, filed on Dec. 17, 2018, the entire contents of which are being incorporated herein by reference.

FIELD OF THE INVENTION

The present invention relates to the roasting coffee beans, and more specifically to the roasting of partially pre-roasted beans, preferably in relatively small quantities of coffee beans, particularly suited for use in the home or in shops and cafes.

BACKGROUND OF THE INVENTION

Usually, the roasting of coffee beans consists in roasting green coffee beans. This roasting requires time and generates a certain volume of smoke, particularly at the first stage of the roasting. Moreover roasting requires a certain knowledge to obtain the best roasting from various different green beans and to match the preferences of the final customers. As a simpler alternative to the roasting of green beans, it has been proposed to roast partially roasted beans. These beans have been partially roasted at a manufacturing roasting plant up to a point that enables a second final roasting before consumption. The first partial roasting provides the advantage of shortening the final roasting, which can last few minutes only. Another advantage is that less smoke is generated during the final roasting. The use of partially roasted beans has been described in WO 03/082705, US 2013/180406, WO 2015/110337, WO 2015/162021.

Thanks to this alternative, roasting becomes easier for non-roasting experts and a new range of roasting apparatus can be proposed for use in the home or in shops and cafes. Such roasting apparatuses can be automatized enough so that operators without experience in roasting can launch the roasting operation.

Where a roasting apparatus is configured for roasting partially pre-roasted beans only, there is a risk that the user erroneously introduces green beans in the apparatus, particularly if the user is a non-expert. The problem is that the heating profile for partially roasted beans is different from the heating profile starting from green beans. Using a heating profile that is not adapted to green beans presents the consequence that, at the end of the roasting process, the green beans may not be sufficiently roasted with the associated risk that these beans damage the device used to grind the roasted in a subsequent step and that the coffee extracted from these roasted and ground beans present a high level of acrylamide.

Similarly, when a roasting apparatus is operated by a non-expert, there is a risk that the user forgets to remove fully roasted beans from the apparatus at the end of the roasting operation and initiates a new roasting without these already roasted beans. The consequence is that these beans may burn and create a fire inside the apparatus. It may also happen that the user initiates a roasting operation with partially pre-roasted beans and stop the roasting process before it has reached its end for an unpredictable reason. The user restart the roasting later with a new roasting cycle initiated from the beginning. This restart of the roasting may lead to the above mentioned risk of fire or to the problem of a roasting that is not adapted to the beans leading to a poor final quality.

SUMMARY OF THE INVENTION

An object of the present invention is to improve the roasting of coffee beans in apparatuses implementing roasting of partially roasted beans.

It would be advantageous to provide a roasting apparatus avoiding risk of fire due to load of erroneous coffee beans such as green beans or fully roasted beans.

It would be advantageous to provide a roasting apparatus controlling the load of correct coffee beans inside the apparatus without the use of costly detectors (code reader, beans identifier (colours sensor, humidity sensor)).

Objects of the invention are achieved by the apparatus for roasting coffee beans according to Claim 1, the method of Claim 11 and the computer program according to Claim 13.

In the present application, by "partially pre-roasted beans", it is understood beans having been obtained by heating green coffee beans and stopping said heating process before the end of the first crack. This definition includes beans having been obtained by heating green coffee beans and stopping said heating process before the beginning of the first crack.

In the present application, by "fully roasted beans", it is understood beans having been roasted after the second crack.

In a first aspect of the invention, there is provided an apparatus for roasting coffee beans comprising:
- a vessel to contain coffee beans,
- an electrical heating device to heat coffee beans contained in the vessel,
- at least one temperature sensor to measure temperature in the vessel,
- a control system operable to control the heating device, wherein the control system is configured to:
- apply a roasting recipe dedicated to the roasting of partially pre-roasted beans comprising at least a temperature versus time profile by controlling the electrical heating device based on the measure of the temperature sensor,
- detect a decrease of the consumption of electrical power in function of time,
- stop heating if no decrease of the consumption of electrical power happens after a set reference time $t_1$.

In the vessel coffee beans are heated and preferably mixed to homogenise heating through the beans.

Mixing can be obtained with a fluidic bed of hot air or mechanically with stirring blades or through rotation of a rotating drum.

Preferably the vessel is hot air fluid bed chamber. Within such a vessel, heated air is forced through a screen or a perforated plate under the coffee beans with sufficient force to lift the beans. Heat is transferred to the beans as they tumble and circulate within this fluidized bed. Alternatively the vessel can be a drum chamber wherein the coffee beans are tumbled in a heated environment. The drum chamber can consist of a horizontal rotating drum or the drum chamber can comprise stirring blades to tumble the coffee beans in a heated environment.

As a source of heating, the apparatus comprises an electrical heating device.

An electrically powered heating device presents the advantage that the air pollutants produced during the roasting are pollutants generated from the heating of coffee beans themselves and not from the burning of gases as it happens when the source of heating is a gas burner using natural gas, propane, liquefied petroleum gas (LPG) or even wood.

This electrical heating device comprises usually at least a heater and preferably an air driver. Usually the heater is an electrical resistance. In addition, preferably, the electrical heating device comprises an air driver to circulate air heated by the heater. In some apparatus, the air driver is not necessary, for example when the apparatus comprises stirring blades or is a rotating drum.

The apparatus comprises at least one temperature sensor to measure temperature in the vessel. The sensor can be positioned inside the volume of the vessel or near the inlet of heated air in the vessel.

The apparatus comprises a control system operable to control the electrical heating device in order to apply a temperature versus time profile inside the vessel. This control is implemented based on the measure of the temperature sensor positioned in the vessel in feedback loop control.

The temperature versus time profile corresponds to a roasting recipe dedicated to the roasting of partially pre-roasted beans. Usually, the time length of such a profile is shorter than the time length of the profile dedicated to the roasting of green coffee beans.

In addition, the control system is configured to detect the first decrease of the consumption of electrical power of the heating device in function of time.

Generally, the control system can be configured to measure at least one electrical parameter representative of the consumption of electrical power by the heating device during the time the roasting recipe is applied. This electrical parameter representative of the consumption of electrical power is usually the current of the electrical heating device.

Based on the measure of the at least one electrical parameter representative of the consumption of electrical power by the heating device during the time the roasting recipe is applied, the consumption of electrical power based on time can be monitored.

In the process of roasting coffee beans starting from green coffee beans up to a roasting level that enables the preparation of a coffee beverage by infusion with water, the coffee beans go through several stages and in particular through:
  a first stage where endothermic reactions happen, then
  a first crack step where exothermic internal reactions occur, then
  a second stage where endothermic reactions happen, then
  a second crack step where exothermic internal reactions occur.

At the first crack step, exothermic reactions generated inside the coffee beans produce heat and participate to the global heating. As a result less heat production is required from the electrical heating device and accordingly the power of the heating device decreases.

Depending if green beans or partially pre-roasted beans are heated, the time the first crack step occurs is different:
  it is longer for the green beans than for the partially pre-roasted beans, usually by at least 2 minutes,
  there is no first crack for fully roasted beans.

It means that green beans and fully roasted beans can be differentiated from partially roasted beans in that, by applying the same roasting profile, the first crack happens later for the green beans compared to the partially roasted beans or not at all for the fully roasted beans. As a result by setting a reference time at which the first crack of partially pre-roasted beans usually happens, it is possible to detect if it is effectively partially pre-roasted beans present in the vessel and being roasted.

The control system is configured to stop the electrical heating device if no decrease of the consumption of electrical power happens after a set reference time. Actually, by setting the reference time to the time the first crack of partially pre-roasted beans happens, if no decrease of consumption happens that time, it means that green beans or fully roasted beans have been introduced or even no beans have been introduced inside the vessel. By security, the heating is stopped.

A message can be displayed to inform the operator and induce him to heck the nature of the beans introduced inside the vessel.

Advantageously objects of the invention are solved since the above detection of the time the first decrease of the consumption of electrical power by the heating device occurs enables to verify the nature of the beans introduced inside the vessel.

The reference time $t_1$ can be defined according to the nature of the partially pre-roasted beans produced in order to be used in the roasting apparatus applying the roasting recipe dedicated to the roasting of partially pre-roasted beans.

Preferably, the reference time for the first decrease of the consumption of electrical power is set to 5 minutes.

Actually, it has been observed that for green beans, the first decrease of the consumption of electrical power is usually of at least 5 minutes.

It may be possible that the operator introduces inside the vessel beans pre-roasted up to a point between the end of the first crack and the beginning of the second crack, or that he forgets to remove beans from a previous roasting operation from the vessel. In that case, by applying the roasting profile, there is no first crack, but the second crack happens very rapidly after starting heating these beans. In case such an error happens, the issue of fire is less critical than for fully roasted beans, but the final roasting does not lead to an optimised product and such a roasting is not recommended.

In a preferred embodiment, in order to avoid such an erroneous roasting, the control system can be configured to stop the electrical heating device if the first decrease of the consumption of electrical power happens before a set reference time $t_0$. Preferably, this reference time $t_0$ is set to 3 minutes.

In one embodiment, the control system is configured to obtain identification of the coffee beans introduced in the vessel by the user. The identification of beans relate to the nature of the beans which has the direct impact on the process of roasting the beans. Generally, the nature relates to the origin of the beans (Arabica, Robusta, . . . ).

The identification of the beans can be obtained:
  by manual input from the user,
  from an identification device configured to read automatically identification means from a beans package presented by the user.

In all cases, the beans are introduced inside the vessel by the user, which explains the problem that the beans in the vessel may not be partially pre-roasted beans.

The control system can be configured to obtain the roasting recipe corresponding to the identified coffee beans before the step of applying the roasting recipe. The roasting recipe can be obtained:
  from a memory,
  from a server,
  from the identification device.

The above aspects of the invention may be combined in any suitable combination. Moreover, various features herein may be combined with one or more of the above aspects to provide combinations other than those specifically illustrated and described. Further objects and advantageous features of the invention will be apparent from the claims, from the detailed description, and annexed drawings.

BRIEF DESCRIPTION OF THE DRAWINGS

The characteristics and advantages of the invention will be better understood in relation to the following figures.

DETAILED DESCRIPTION OF THE DRAWINGS

Figure 1:
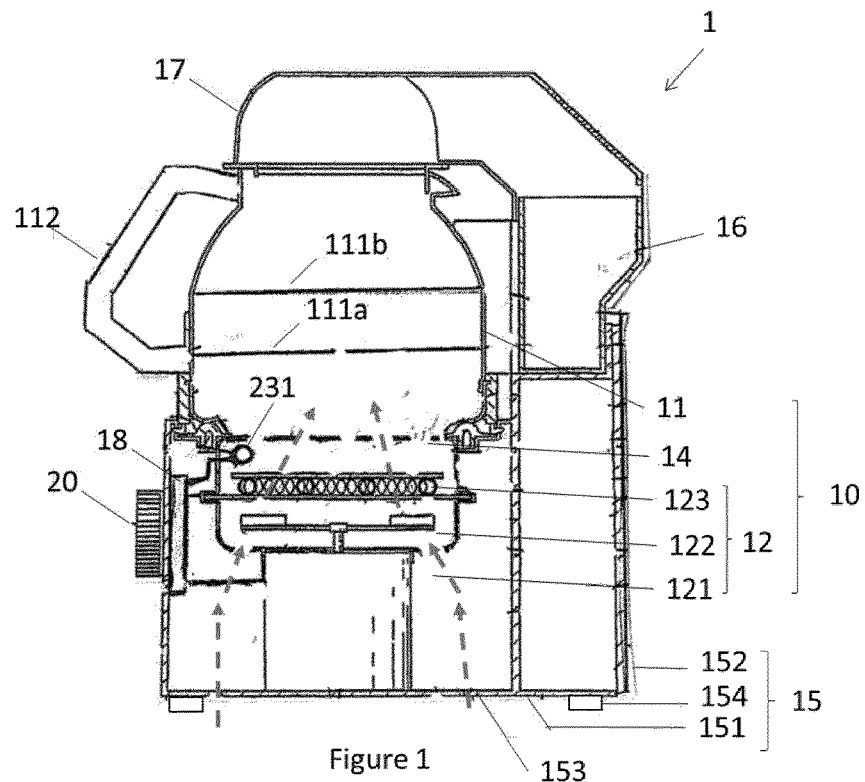
FIG. 1 is a schematic drawing of a general roasting apparatus enabling the implementation of the method of the present invention.

FIG. 1 shows an illustrative view part of a roasting apparatus 1. Functionally, the roasting apparatus 1 is operable to roast coffee beans hold in a vessel 11 by means of a flow of hot air introduced inside this vessel. At a first level, the apparatus comprises: a housing 15, a roasting unit 10 and a control system 180. These components will now be sequentially described.

Housing of Roasting Apparatus

The housing 15 houses and supports the aforementioned components and comprises a base 151 and a body 152. The base 151 being for abutment with a support surface, preferably through feet 154 that provide a gap between the base and the support surface. The body 152 is for mounting thereto the components.

Roasting Unit of Roasting Apparatus

The roasting unit 10 is operable to receive and roast coffee beans.

The roasting unit 10 typically comprises at a second level of the roasting apparatus 1: a vessel 11, a heating device 12 comprising an air flow driver 122, a heater 123, which are sequentially described.

The vessel 11 is configured to receive and hold the coffee beans introduced by the operator. A removable cover 17 enables the introduction and removal of beans. The bottom of the vessel is configured to enable air to pass through, specifically it can be a perforated plate 14 on which the beans can lie and through which air can flow upwardly.

A chaff collector 16 is in flow communication with the vessel 1 to receive chaffs that progressively separate from the beans and due to their light density are blown off to the chaff collector.

The vessel 11 comprises a handle 112 in order to enable the user to remove the vessel from the housing 15 and get the roasted beans.

The heating device 12 comprises an air flow driver 122 and a heater 123.

The air flow driver 122 is operable to generate a flow of air (dotted lines arrows) in direction of the bottom of the chamber. The generated flow is configured to heat the beans and to agitate and lift the beans. As a result the beans are homogenously heated. Specifically, the air flow driver is usually a fan powered by a motor 121. Air inlets 153 can be provided inside the base 151 of the housing in order to feed air inside the housing, the air flow driver blowing this air in direction of the vessel 11 through the perforated plate 14 as illustrated by dotted lines arrows.

The heater 123 is operable to heat the flow of air generated by the air flow driver 122. In the specific illustrated embodiment, the heater is an electrical resistance being positioned between the fan 122 and the perforated plate 14 of the vessel with the result that the flow of air is heated before it enters the vessel to heat and to lift the beans.

Although the invention is described with a roaster implementing a fluidized bed of hot air, the invention is not limited to this specific type of roasting apparatus. Drum roasters and other kinds of roasters using an electrical heating device can be used.

For example, in an alternative embodiment of the illustrated roaster of FIG. 1, the vessel can comprise a rotating device to rotate the beans inside the vessel. In that case, a simple flow of air can be provided by a heater, the rotating device enabling the homogeneous heating of the beans.

The heating device 12 is operable to apply a roasting profile to the beans, this roasting profile being defined as a curve of temperature against time.

In one mode, the speed of the fan 122 can be fixed and the heater 123 is operable to apply a roasting profile to the beans based in particular on the temperature measured by the temperature sensor 231. The heater is operable by modifying its supplied electrical power.

In another mode, the electrical power applied by the heater 123 can be fixed and the motor 121 of the fan is operable to apply a roasting profile to the beans based in particular on the temperature measured by the temperature sensor 231. The motor is operable by modifying its supplied electrical power.

In a last mode, both the air flow driver 122 and the heater 123 can be operable to apply a roasting profile to the beans.

Control System of Roasting Apparatus

Figure 2:
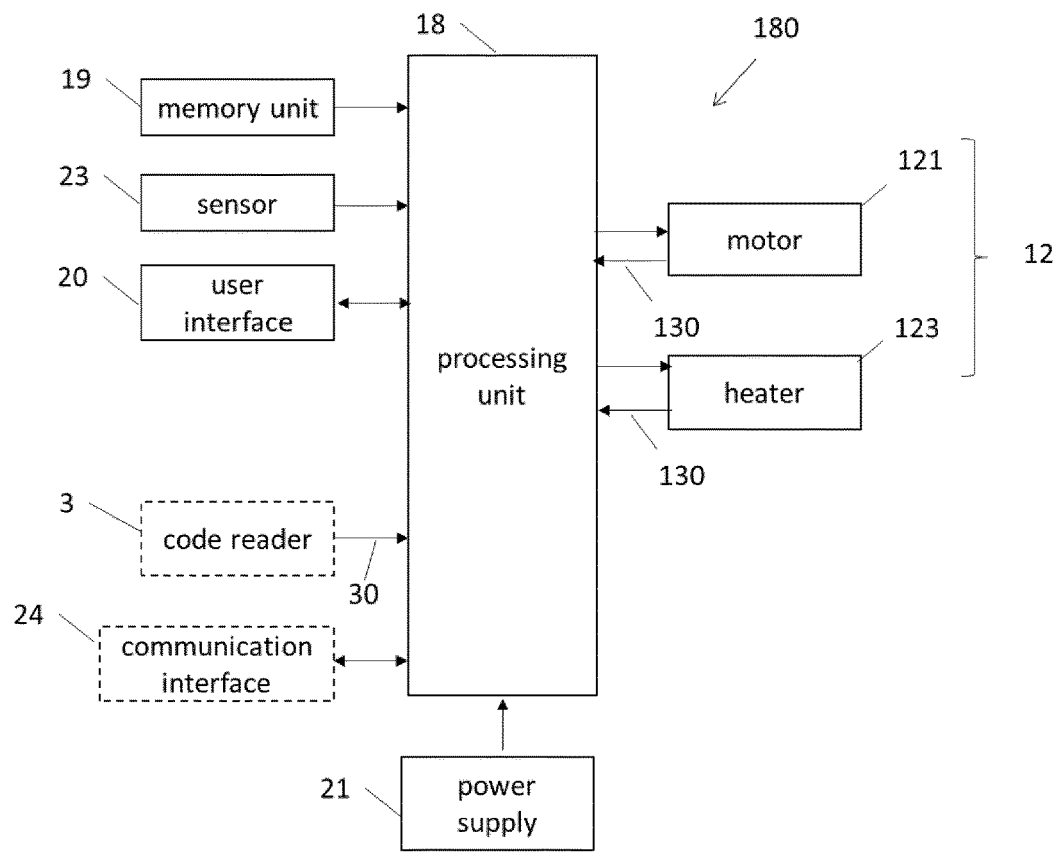
FIG. 2 shows a block diagram of a control system of the general apparatus according to FIG. 1.

With reference to FIGS. 1 and 2, the control system 180 will now be considered: the control system 180 is operable to control the components of the roasting unit to roast coffee beans. The control system 180 typically comprises at a second level of the roasting apparatus: a user interface 20, a processing unit 18, at least one sensor 23, a power supply 21, a memory 19, optionally a communication interface 24 for remote connection.

The user interface 20 comprises hardware to enable a user to interface with the processing unit 1, by means of user interface signal. More particularly, the user interface receives commands from a user, the user interface signal transfers the said commands to the processing unit 18 as an input. The commands may, for example, be information about the nature of the beans introduced in the vessel (such as origins, reference of supplier), an instruction to execute a roasting process (start the process) and/or to adjust an operational parameter (desired level of final roasting, quantity of beans to be roasted) of the roasting apparatus 1 and/or to power on or off the roasting apparatus 1. The processing unit 18 may also output feedback to the user interface 20 as part of the roasting process, e.g. to indicate the roasting process has been initiated or that a parameter associated with the process has been selected or to indicate the evolution of a parameter during the process or to create an alarm.

The hardware of the user interface may comprise any suitable device(s), for example, the hardware comprises one or more of the following: buttons, such as a joystick button, knob or press button, joystick, LEDs, graphic or character LDCs, graphical screen with touch sensing and/or screen edge buttons. The user interface 20 can be formed as one unit or a plurality of discrete units.

A part of the user interface can also be on a mobile app when the apparatus is provided with a communication interface 24 as described below.

The at least one sensor 23 is operable to provide an input signal to the processing unit 18 for monitoring of the roasting process and/or a status of the roasting apparatus. The input signal can be an analogue or digital signal. The sensors 23 typically comprise at least one temperature sensor 231 and optionally one or more of the following sensors: beans level sensor associated with the vessel 1, position sensor associated with the vessel 11 and/or the chaff collector 16.

The processing unit 180 can comprise a code reader 3 associated with e.g. a system to read code on beans packaging.

The processing unit 180 comprises as an input 130 one electrical parameter representative of the consumption of electrical power by the heating device 12 during the time the roasting recipe is applied. This electrical parameter can be the current applied to the heater to apply the heating profile to the beans and/or the current applied to the motor 121 of the air flow driver.

The processing unit can comprises a communication interface 24 for data communication of the roasting apparatus 1 with another device and/or system, such as a server system and/or a mobile device. The communication interface 24 can be used to supply and/or receive information related to the coffee beans roasting process, such as roasting process information, nature of the beans, quantity of beans. The communication interface 24 may comprise a first and second communication interface for data communication with several devices at once or communication via different media.

The communication interface 24 can be configured for cabled media or wireless media or a combination thereof, e.g.: a wired connection, such as RS-232, USB, I2C, Ethernet define by IEEE 802.3, a wireless connection, such as wireless LAN (e.g. IEEE 802.11) or near field communication (NFC) or a cellular system such as GPRS or GSM. The communication interface 24 interfaces with the processing unit 18, by means of a communication interface signal. Generally the communication interface comprises a separate processing unit (examples of which are provided above) to control communication hardware (e.g. an antenna) to interface with the master processing unit 18. However, less complex configurations can be used e.g. a simple wired connection for serial communication directly with the processing unit 18.

The processing unit 18 generally comprise memory, input and output system components arranged as an integrated circuit, typically as a microprocessor or a microcontroller. The processing unit 18 may comprises other suitable integrated circuits, such as: an ASIC, a programmable logic device such as a PAL, CPLD, FPGA, PSoC, a system on a chip (SoC), an analogue integrated circuit, such as a controller. For such devices, where appropriate, the aforementioned program code can be considered programed logic or to additionally comprise programmed logic. The processing unit 18 may also comprise one or more of the aforementioned integrated circuits. An example of the later is several integrated circuits is arranged in communication with each other in a modular fashion e.g.: a slave integrated circuit to control the user interface 20 in communication with a master integrated circuit to control the roasting unit 10.

The processing unit 18 generally comprises a memory unit 19 for storage of instructions as program code and optionally data. To this end the memory unit typically comprises: a non-volatile memory e.g. EPROM, EEPROM or Flash for the storage of program code and operating parameters as instructions, volatile memory (RAM) for temporary data storage. The memory unit may comprise separate and/or integrated (e.g. on a die of the semiconductor) memory. For programmable logic devices the instructions can be stored as programmed logic.

The instructions stored on the memory unit 19 can be idealised as comprising a coffee beans roasting program. The coffee beans roasting program can be executed by the processing unit 18 in response to the said input such as the commands from the user interface 20 and/or the signal of the sensors 23 like temperature sensor 231, beans level or quantity sensor, code reader 3. Execution of the coffee beans roasting program causes the processing unit 18 to control the following components: the heater 123 and the air flow driver 122.

The processing unit 18 is operable to:
receive an input, i.e. the commands from the user interface 20 and/or the signal of the sensors (e.g. the temperature sensor 231 associated with the vessel 1, the beans level sensor) and/or the code reader 3,
process the input according to roasting program code (or programmed logic) stored on the memory unit 19 and/or imputed from an external source such as the communication interface 24,
provide an output, which is the roasting process. More specifically the output comprises the operation of at least the heater 123 the air flow driver 122.

Operation of the heating device 12, that is the heater 123 and/or the air flow driver 122, is usually closed-loop control using the input signal from the temperature sensor 231 as feedback to apply the temperature versus time profile to the coffee beans.

A part of the roasting program is based on a roasting recipe comprising a temperature versus time profile to be applied to the beans. The coffee beans roasting program is configured for roasting partially pre-roasted beans.

Figure 3:
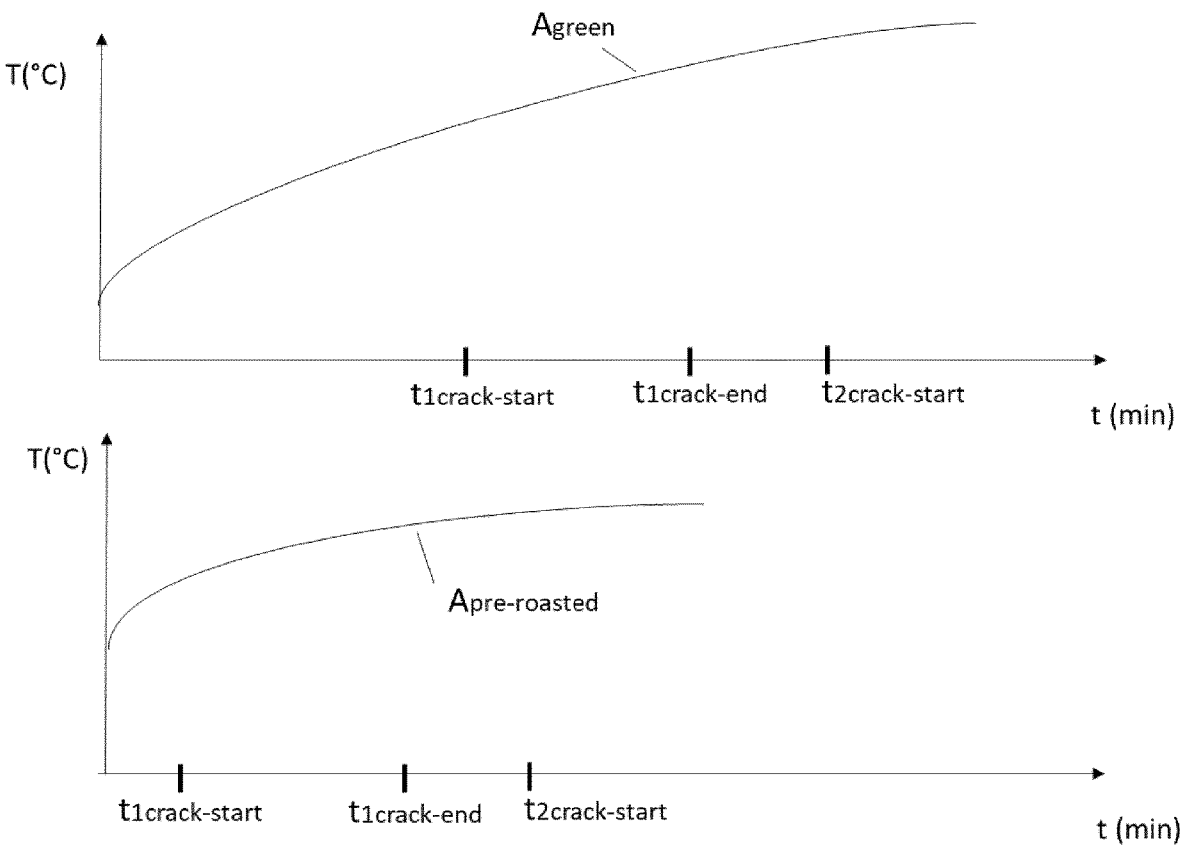
FIG. 3 represents schematically curves of heating profile applied to green beans and to partially pre-roasted beans.

FIG. 3 illustrates the heating profiles (temperature versus time) for roasting green coffee beans (curve $A_{green}$) and partially pre-roasted beans of the same origin (curve $A_{pre-rosated}$) in the apparatus 1. $t_{1.crack\text{-}start}$ is the time corresponding to the start of the first crack, $t_{1.crack\text{-}end}$ is the time corresponding to the end of the first crack, $t_{2.crack\text{-}start}$ is the time corresponding to the start of the second crack.

As illustrated in curve $A_{pre-rosated}$, when the beans have been partially pre-roasted, the heating profile is shorter in time: the first part of the curve $A_{green}$ is not applied, yet the heating profile starts before $t_{1.crack\text{-}end}$. Accordingly, in the roasting apparatus 1, the control system is configured to apply a roasting recipe or roasting program dedicated to the roasting of partially pre-roasted beans such as illustrated by the heating profile of curve $A_{pre-rosated}$.

The power supply 21 is operable to supply electrical energy to the controlled components and the processing unit 18. The power supply 21 may comprise various means, such as a battery or a unit to receive and condition a main electrical supply. The power supply 21 may be operatively linked to part of the user interface 20 for powering on or off the roasting apparatus 1.

Based on another part of the instructions stored on the memory unit 19, the processing unit 18 is operable to:
- detect the first decrease of the consumption of electrical power of the heating device in function of time, preferably by measuring at least one electrical parameter 130 representative of the consumption of electrical power by the heating device 12 during the time the roasting recipe is applied,
- stop the electrical heating device 12 if no decrease of the consumption of electrical power happens after a set reference time $t_1$.

During the roasting operation, the input 130 of the current applied to the heating device 12 or any other electrical parameter representative of the consumption of electrical power by the heating device can be monitored by the processing unit 18.

Based on the measure of the at least one electrical parameter of the heating device 12 during the time the roasting recipe is applied, the processing unit 18 is configured to calculate the consumption of electrical power by the heating device 12 and is able to detect a decrease of this electrical power consumption in function of time.

Based on the follow-up of the electrical power consumption of the heating device, the processing unit 18 is configured to stop the electrical heating device if no decrease of the consumption of electrical power happens after a set reference time $t_1$.

Actually, if no decrease of consumption of power happens in a relatively short time after the start of the process, it means that no partially pre-roasted beans have been introduced inside the apparatus and that the vessel 11 holds either green beans or fully roasted beans or even no beans at all.

As illustrated in the curves of FIG. 3, while applying the same heating profile to partially pre-roasted coffee beans and green beans of same origins (that is the partially pre-roasted coffee beans have been obtained from said green beans), the first crack of green beans happens later than the first crack of the partially pre-roasted coffee beans.

Figure 4:
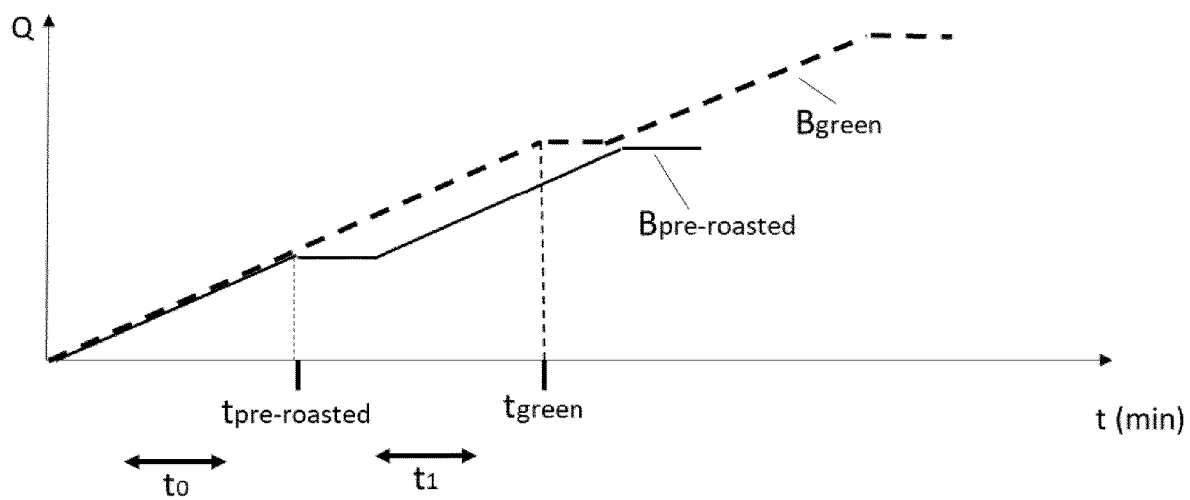
FIG. 4 represents schematically a first curve of the electrical power consumption of the heating device during the step of roasting a partially pre-roasted coffee beans and a second curve of the electrical power consumption of the heating device during the step of roasting green beans.

FIG. 4 illustrates schematically the electrical power consumption Q of the heating device 12 during the heating of:
- green beans (Curve $B_{green}$ in dotted line), and
- to partially pre-roasted coffee beans obtained from the same origin as the green beans (Curve $B_{pre-roasted}$)

according to the heating profile (temperature versus time) of curve $A_{pre-roasted}$ of FIG. 3.

In both cases, the general profile of this curve is globally a straight line with a positive slope. Yet, in both cases, the slope decreases a short time before increasing again. This decrease corresponds to the time the first crack of the beans happens: due the generated exothermic reactions, less heat from the electrical heating device is required and the electrical consumption decreases.

The decrease of consumption corresponding to the first crack of the partially pre-roasted beans happens at time $t_{pre-roasted}$, that is earlier than the time $t_{green}$ corresponding to the decrease of consumption corresponding to the first crack of the green beans.

By setting a reference time $t_1$ greater than $t_{pre-roasted}$ but smaller than $t_{green}$, it is possible to discriminate partially pre-roasted beans from green beans and fully roasted beans. In general, the reference time $t_1$ can be set to 5 minutes. Indeed, when roasted, most of the green beans present a first crack happening after at least 5 minutes.

If fully roasted beans roasted up to after the second crack had been introduced in the vessel in place of partially roasted beans, then no increase of decrease of consumption would be detected at all If beans roasted up to a point between the end of the first crack and the beginning of the second crack, then the decrease of consumption would be immediate and would be detected before $t_{pre-roasted}$. Accordingly, by setting a reference time to smaller than $t_{pre-roasted}$, it is possible to discriminate these beans from partially pre-roasted beans. In general (but it may depend from one type of partially pre-roasted beans to another), the reference time $t_0$ is set to 3 minutes.

Finally depending on the type of identified beans, the control system is configured to continue or stop the heating device 12.

If the beans are identified as partially pre-roasted beans, the heating according to the roasting recipe can be pursued.

If the beans are identified as green beans or fully roasted beans, the heating is stopped and an alert is sent to the user, for example through the user interface 20.

As a result, beans are introduced inside the vessel by the user and information about their type can be supplied by the user to the processing unit in the more advanced mode (either manually or automatically with a code). Yet, whatever the mode, since the beans are introduced manually inside the vessel, there is a risk that the user does not introduce partially pre-roasted beans inside the vessel, and in particular forgets to remove fully roasted beans from a precedent operation or introduces green beans inside the vessel.

The apparatus of the present invention presents the advantage of avoiding any risk of fire due to inadvertence of the user without implementing complex and costly devices.

In the step of applying a roasting recipe comprising at least a temperature versus time profile by controlling the electrical heating device based on the measure of the temperature sensor, the roasting recipe can be a recipe by default for roasting partially pre-roasted beans or can be a recipe dedicated to the partially pre-roasted beans identified in the optional identification step and derived from an optional step of obtaining the dedicated roasting recipe for these identified beans.

This dedicated roasting recipe can be obtained from the memory unit 19 of the roasting apparatus or downloaded from a server through the communication interface 24 or read by the code reader during the optional step of code reading, the recipe being part of the information related to the identification of the beans.

Although the invention has been described with reference to the above illustrated embodiments, it will be appreciated that the invention as claimed is not limited in any way by these illustrated embodiments.

Variations and modifications may be made without departing from the scope of the invention as defined in the claims. Furthermore, where known equivalents exist to specific features, such equivalents are incorporated as if specifically referred in this specification.

As used in this specification, the words "comprises", "comprising", and similar words, are not to be interpreted in an exclusive or exhaustive sense. In other words, they are intended to mean "including, but not limited to".

LIST OF REFERENCES IN THE DRAWINGS roaster 1
roasting unit 10
vessel 11
handle 112
heating device 12
motor 121 air flow driver 122
heater 123
perforated plate 14
housing 15
base 151
body 152
air inlet 153
feet 154
chaff collector 16
cover 17
processing unit 18
control system 180
memory 19
user interface 20
power supply 21
sensor 23
temperature sensor 231
communication interface 24
code reader 3

The invention claimed is:

1. An apparatus for roasting coffee beans, the apparatus comprising:
  a vessel configured to contain coffee beans,
  an electrical heating device configured to heat the coffee beans contained in the vessel,
  at least one temperature sensor configured to measure a temperature in the vessel,
  a control system operable to control the electrical heating device,
  wherein the control system is configured to:
    apply a roasting recipe dedicated to roasting partially pre-roasted beans according to a temperature versus time profile by controlling at least the electrical heating device based on the temperature measured by the at least one temperature sensor,
    detect a decrease of a consumption of electrical power of the electrical heating device in function of time, and
    stop heating if no decrease of the consumption of electrical power is detected after a set reference time $t_1$.

2. The apparatus according to claim 1, wherein the control system is configured to measure at least one electrical parameter representative of the consumption of electrical power by the electrical heating device during a time the roasting recipe is applied.

3. The apparatus according to claim 2, wherein the at least one electrical parameter representative of the consumption of electrical power is a current of the electrical heating device.

4. The apparatus according to claim 1, wherein electrical heating device comprises at least a heater.

5. The apparatus according to claim 4, wherein the electrical heating device further comprises an air driver.

6. The apparatus according to claim 5, wherein the control system is configured to detect a decrease of consumption by electrical power of the electrical heating device and/or the air driver.

7. The apparatus according to claim 1, wherein the set reference time $t_1$ is 5 minutes.

8. The apparatus according to claim 1, wherein the control system is configured to stop the electrical heating device if a first decrease of the consumption of electrical power is detected before a set reference time $t_0$.

9. The apparatus according to claim 8, wherein the set reference time $t_0$ is 3 minutes.

10. The apparatus according to claim 1, wherein the control system is configured to obtain identification of a type of coffee beans introduced in the vessel.

11. The apparatus according to claim 10, wherein the identification of the coffee beans is obtained:
  by manual input from a user, and
  from an identification device configured to read an identification code from a beans package presented by the user.

12. A method of roasting coffee beans using an apparatus, the method comprising:
  applying a roasting recipe dedicated to roasting partially pre-roasted beans according to a temperature versus time profile by controlling an electrical heating device based on a temperature measure by a temperature sensor,
  measuring one electrical parameter representative of consumption of electrical power by the electrical heating device during a time the roasting recipe is applied,
  detecting a decrease of the consumption of electrical power of the electrical heating device in function of time, and
  stopping heating if no decrease of the consumption of electrical power is detected after a set reference time $t_1$.

13. The method according to claim 12, further comprising stopping the electrical heating device if a first decrease of the consumption of electrical power is detected before a set reference time $t_0$.

14. A computer program of a processing unit of a control system of an apparatus for roasting coffee beans, the apparatus comprising a vessel configured to contain coffee beans, an electrical heating device configured to heat coffee beans contained in the vessel, and a temperature sensor configured to measure a temperature in the vessel, the computer program comprising program code and/or program logic which when executed on the processing unit causes:
  applying a roasting recipe dedicated to roasting partially pre-roasted beans according to a temperature versus time profile by controlling the electrical heating device based on the temperature measured by the temperature sensor,
  measuring one electrical parameter representative of consumption of electrical power by the electrical heating device during a time the roasting recipe is applied,
  detecting a decrease of the consumption of electrical power of the heating device in function of time, and
  stopping heating if no decrease of the consumption of electrical power is detected after a set reference time $t_1$.

15. The computer program according to claim 14, wherein the program code and/or program logic are configured to stop heating if a first decrease of the consumption of electrical power happens before a set reference time $t_0$.

* * * * *